United States Patent
Yu

(10) Patent No.: US 7,523,998 B2
(45) Date of Patent: Apr. 28, 2009

(54) QUICK RELEASE DEVICE FOR A BICYCLE

(75) Inventor: Mark Yu, Taichung (TW)

(73) Assignee: Xero Engineering Inc., Taichung (TW)

( * ) Notice: Subject to any disclaimer, the term of this patent is extended or adjusted under 35 U.S.C. 154(b) by 0 days.

(21) Appl. No.: 11/715,154

(22) Filed: Mar. 6, 2007

(65) Prior Publication Data

US 2007/0209468 A1 Sep. 13, 2007

(30) Foreign Application Priority Data

Mar. 7, 2006 (TW) .............................. 95107566 A

(51) Int. Cl.
*B60B 35/00* (2006.01)
*F16B 21/00* (2006.01)
(52) U.S. Cl. ................. 301/124.2; 403/322.4
(58) Field of Classification Search .............. 301/110.5, 301/124.2; 280/279, 280, 288; 403/321, 403/322.1, 322.4
See application file for complete search history.

(56) References Cited

U.S. PATENT DOCUMENTS

| | | | | | |
|---|---|---|---|---|---|
| 4,400,038 A | * | 8/1983 | Hosokawa | ............... | 301/124.2 |
| 4,724,692 A | * | 2/1988 | Turin et al. | .................... | 70/225 |
| 4,964,287 A | * | 10/1990 | Gaul | ........................... | 70/233 |
| 5,622,412 A | * | 4/1997 | Yamane | ................... | 301/124.2 |
| 7,351,000 B2 | * | 4/2008 | Meggiolan | ............... | 403/322.4 |

* cited by examiner

*Primary Examiner*—Jason R Bellinger
*Assistant Examiner*—Kip T Kotter
(74) *Attorney, Agent, or Firm*—Townsend and Townsend and Crew, LLP

(57) ABSTRACT

A quick release device includes a tightening bar having an enlarged head and an actuated end outboard of two fork blades of a bicycle, and a cam member having front and rear ends, and a cam segment interposed therebetween and engaging a cam follower surface of the actuated end such that rotation of the cam segment results in movement of the actuated end between tightening and loosening positions relative to one of the fork blades. A cover includes front and rear walls which defines an accommodation space therebetween for receiving the actuated end and the cam segment. The front and rear ends extend outwardly of the front and rear walls, respectively. A lever includes front and rear lug portions which are coupled respectively with the front and rear ends of the cam member to enable the cam segment to be rotated by a turning movement of the lever.

7 Claims, 6 Drawing Sheets

QUICK RELEASE DEVICE FOR A BICYCLE

CROSS-REFERENCE TO RELATED APPLICATION

This application claims priority of Taiwanese Application No. 095107566, filed on Mar. 7, 2006.

BACKGROUND OF THE INVENTION

1. Field of the Invention

This invention relates to a quick release device for a bicycle, more particularly to a quick release device used in tightening a hub assembly of a bicycle to left and right fork blades.

2. Description of the Related Art

Referring to FIGS. 1 to 3, a quick release apparatus 10 for a bicycle as disclosed in U.S. Pat. No. 5,622,412 is shown to include a drawbar 11, a housing 12 sleeved on a cam follower member 111 of the drawbar 11, a rotary cam 13 extending perpendicularly to the drawbar 11 and mounted rotatably between the cam follower member 111 and the housing 12, a cam lever 14 coupled to the rotary cam 13 and extending outwardly of the housing 12, and an adjusting bolt 15 screwed to a thread end segment 113 of the drawbar 11.

The rotary cam 13 has a large diameter portion 131, an eccentric cam portion 132 extending axially from the large diameter portion 131, a small diameter portion 133 extending from the cam portion 132 and coaxial with the large diameter portion 131, and a control shank 134 extending axially from the small diameter portion 133. When the rotary cam 13 is inserted into the housing 12 and the cam follower member 111, the cam portion 132 is received in a through hole 112 in the cam follower member 111 such that the control shank 134 is meshed with a toothed hole 141 in the cam lever 14.

In use, when the cam lever 14 is rotated, the cam portion 132 presses the cam follower member 111 to move the drawbar 11 axially so as to tighten or release left and right fork blades 21 of the bicycle to or from a hub assembly 20. However, since the rotary cam 13 is driven to rotate by the cam lever 14 from one side, and since the driving force is concentrated at the control shank 134, the force borne by the rotary cam 13 is not evenly distributed, thereby resulting in wobbling of the rotary cam 13 during the process of rotation. Thus, operation of the conventional quick release apparatus 10 is neither stable nor smooth. Furthermore, due to wobbling of the rotary cam 13 during the rotation process, the precision of movement of the drawbar 11 will be adversely affected.

SUMMARY OF THE INVENTION

The object of the present invention is to provide a quick release device for a bicycle which can enhance stability and smoothness during operation, and which permits precise movement of a tightening bar thereof.

According to this invention, the quick release device includes a tightening bar, a cam member, a cover, and a lever. The tightening bar includes an enlarged head which is adapted to be outboard of a right fork blade of a bicycle, a shank body which extends from the enlarged head, and which is movable relative to a hub assembly along a hub axis, and an actuated end which is connected to the shank body opposite to the enlarged head, which has a cam follower surface, and which is adapted to be outboard of a left fork blade. The cam member has front and rear ends opposite to each other along a rotating axis transverse to the hub axis, a cam segment which is interposed between the front and rear ends, which is rotatable about the rotating axis, and which is configured to engage the cam follower surface. When the cam segment is rotated about the rotating axis, the actuated end is moved between a tightening position, where the actuated end is remote from the left fork blade, and a loosening position, where the actuated end is closer to the left fork blade. The cover includes front and rear walls which are spaced apart from each other along the rotating axis to define an accommodation space therebetween for receiving the actuated end and the cam segment, and which have an access bore and an access hole, respectively. The access bore and the access hole are communicated with the accommodation space such that the front and rear ends extend respectively and outwardly of the access bore and the access hole. The lever includes a handle portion which has proximate and distal ends opposite to each other along a lengthwise direction, and front and rear lug portions which extend from the proximate end away from the distal end. The front and rear lug portions are spaced apart from each other along the rotating axis to flank the front and rear walls of the cover, respectively, and are coupled respectively with the front and rear ends of the cam member to enable the cam segment to be rotated by a turning movement of the distal end about the rotating axis.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
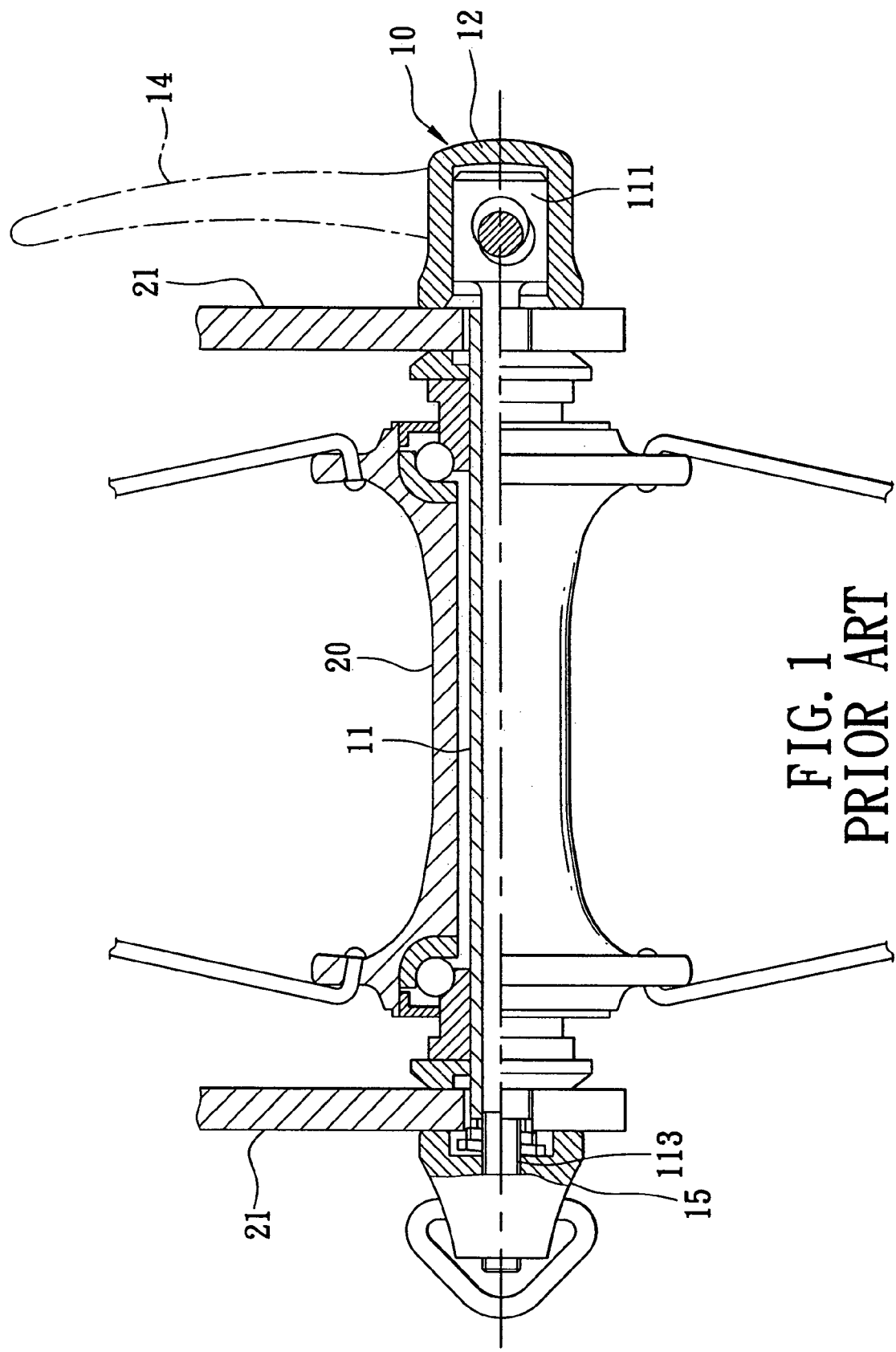
FIG. 1 is a partly sectioned front view of a conventional quick release apparatus incorporated with a hub assembly of a bicycle.
Figure 2:
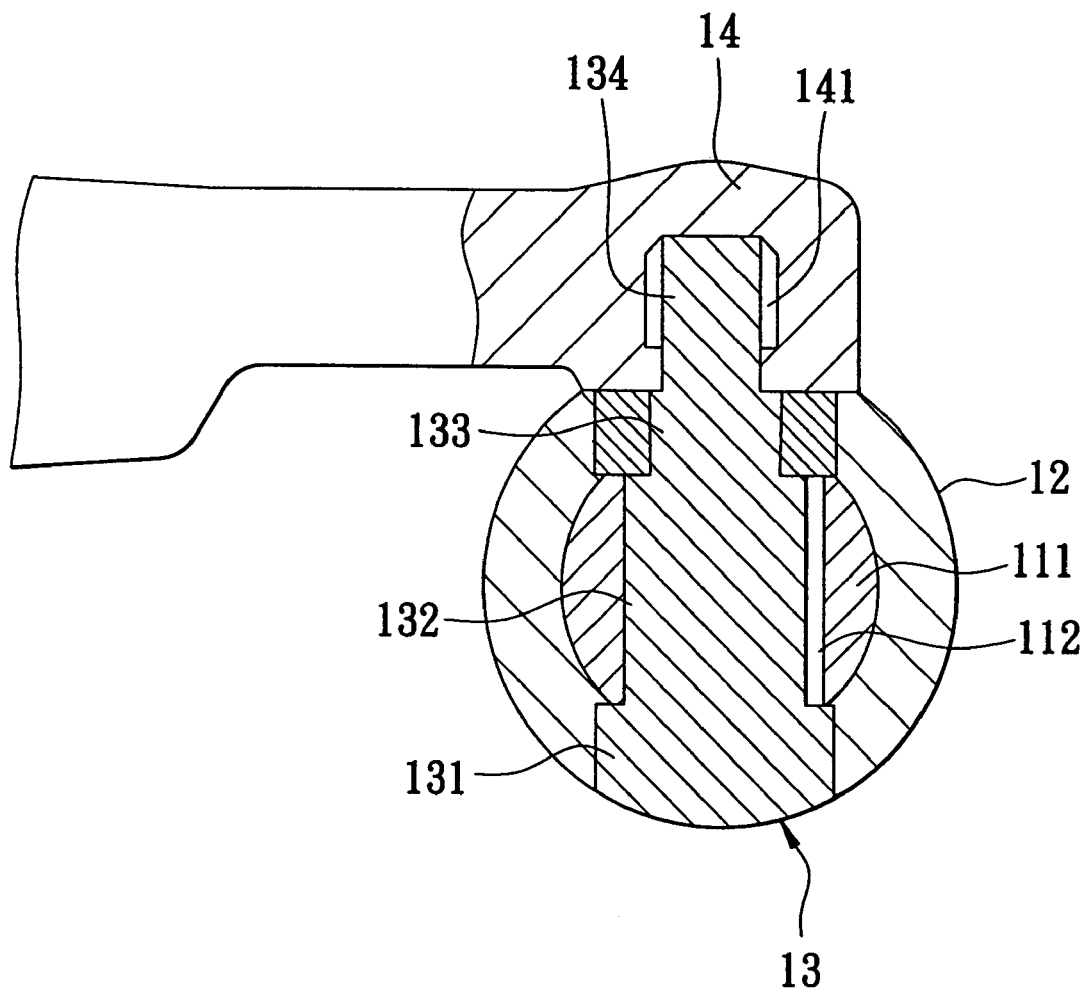
FIG. 2 is a fragmentary sectional view of a portion of the conventional quick release apparatus of FIG. 1.
Figure 3:
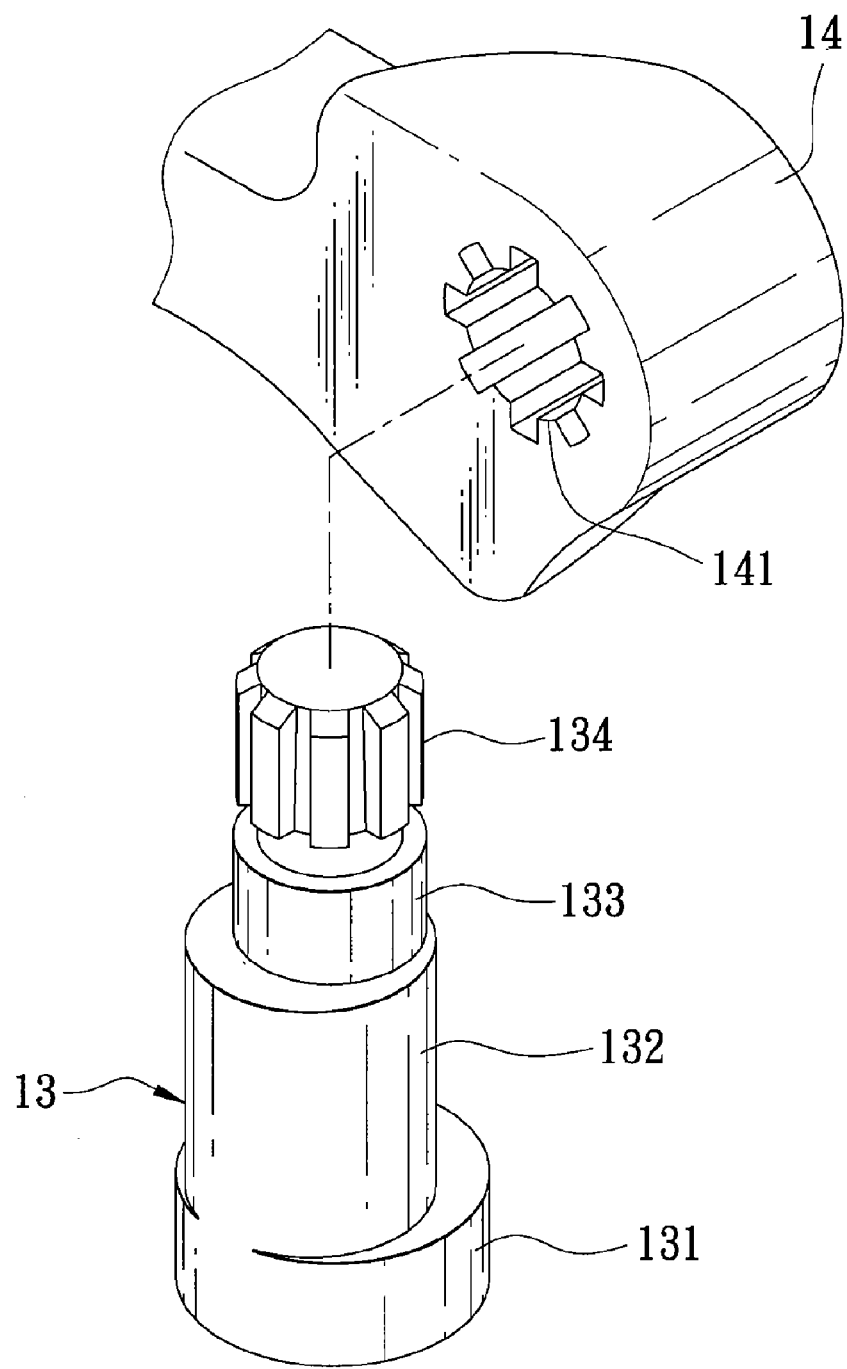
FIG. 3 is an exploded perspective view of a rotary cam and a cam lever of the conventional quick release apparatus of FIG. 1.
Figure 4:
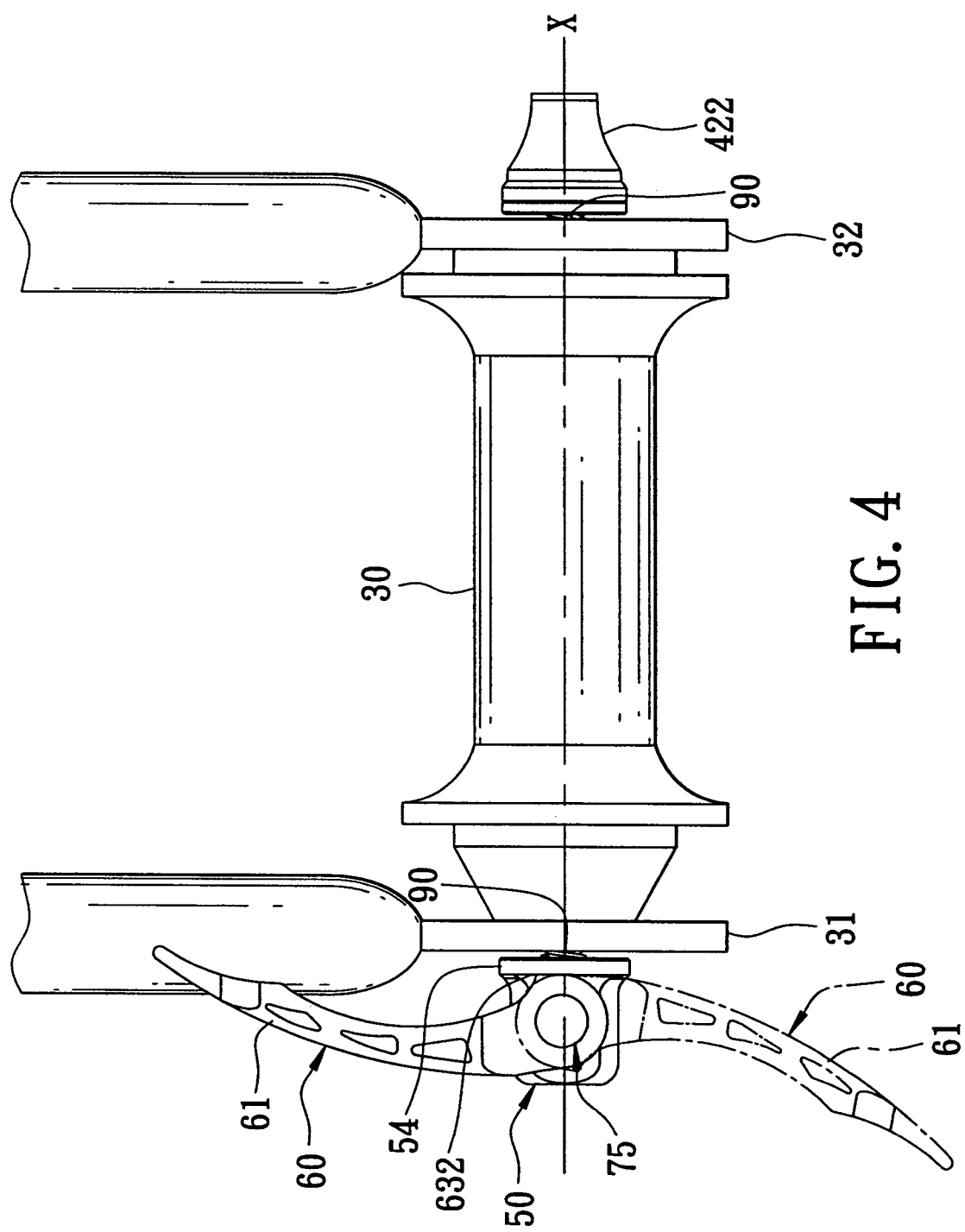
FIG. 4 is a schematic front view of the preferred embodiment of a quick release device according to this invention when incorporated with a hub assembly of a bicycle.
Figure 5:
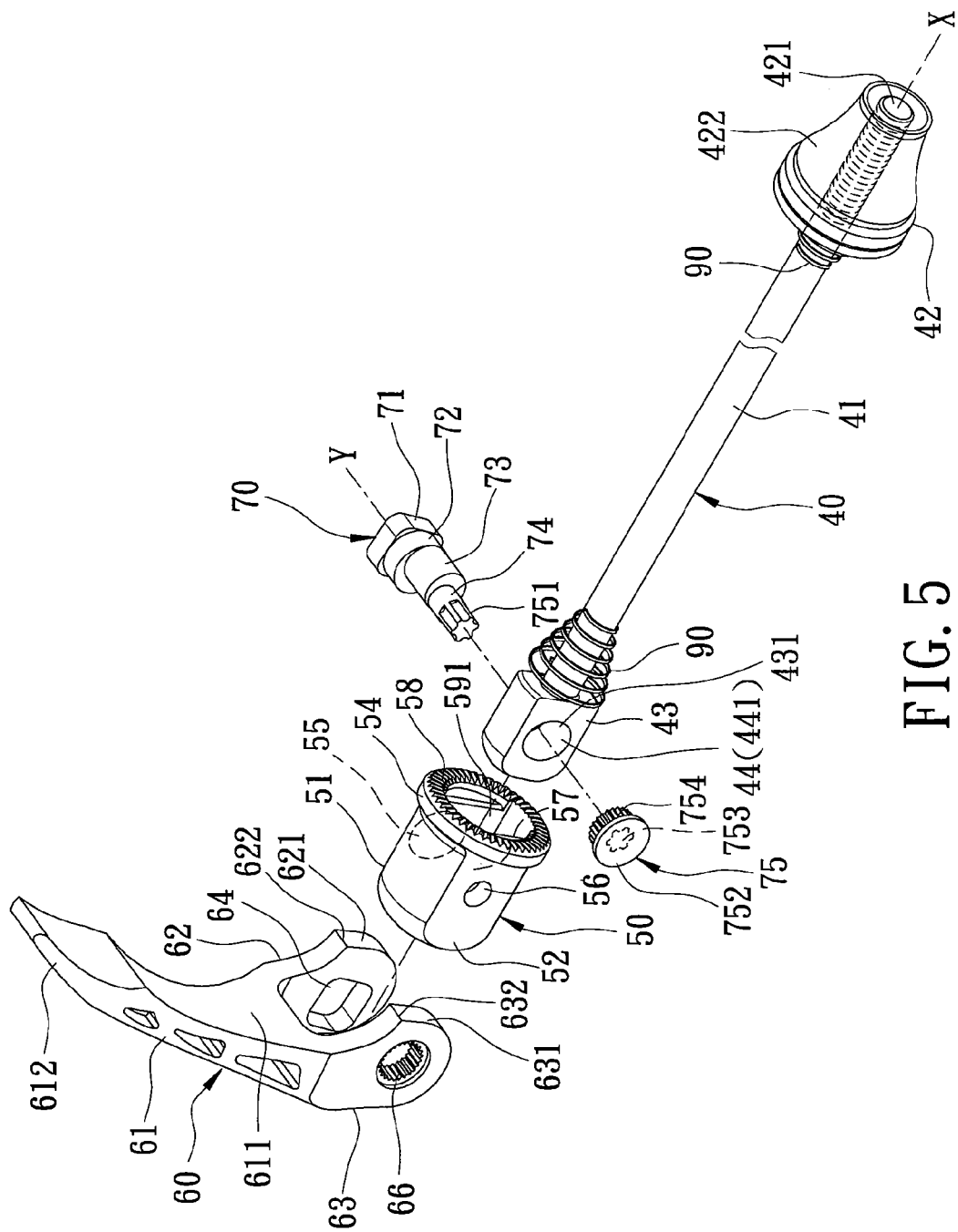
FIG. 5 is an exploded perspective view of the preferred embodiment.
Figure 6:
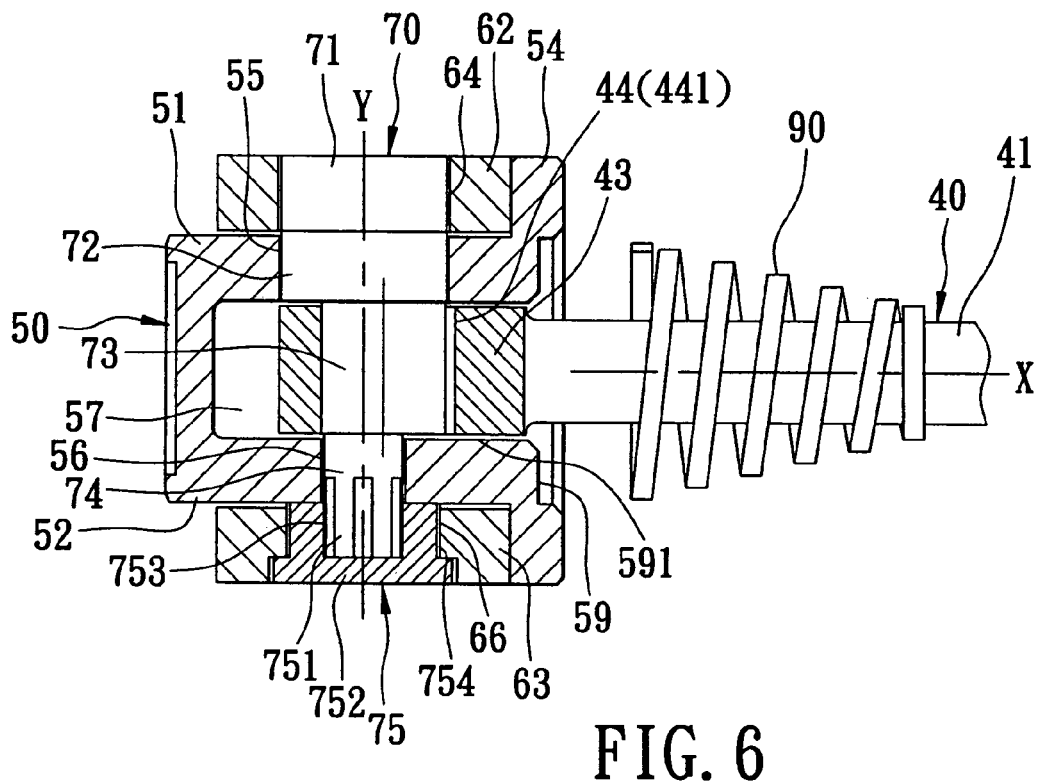
FIGS. 6 and 7 are fragmentary sectional views of the preferred embodiment to illustrate a cam member is in loosening and tightening positions, respectively.
Figure 7:
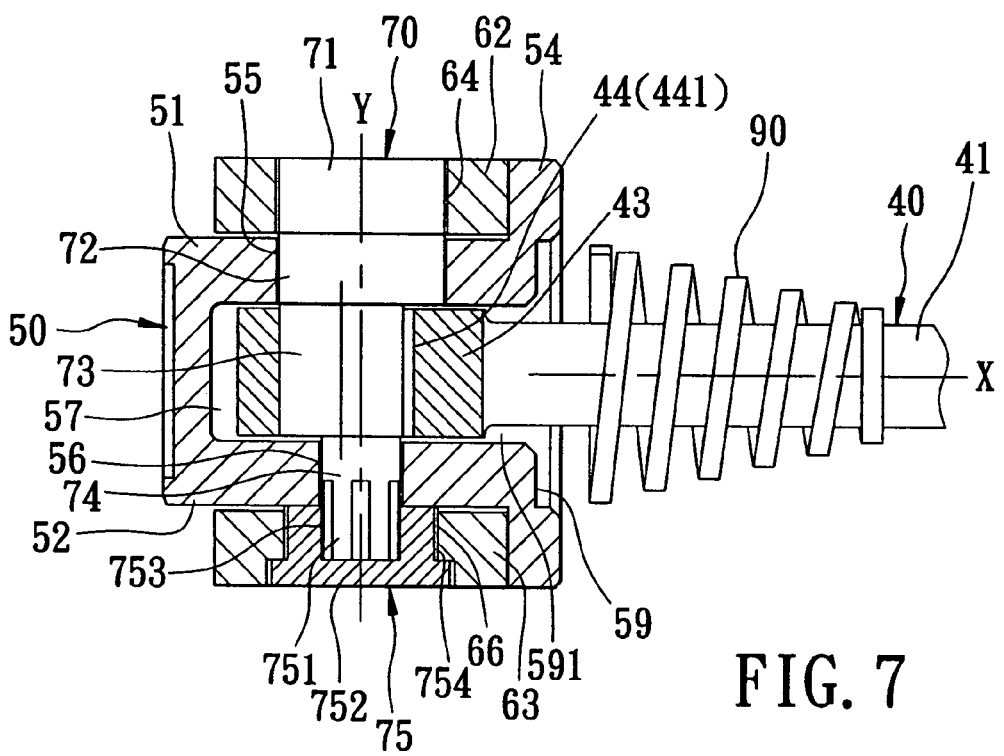

Referring to FIGS. 4 to 6, the preferred embodiment of a quick release device according to the present invention is shown to be mounted between left and right fork blades 31,32 of a bicycle that are spaced apart from each other along a hub axis (X) so as to permit the fork blades 31,32 to be tightened or loosened relative to a hub assembly 30 that is rotatable about the hub axis (X). The quick release device of this embodiment comprises a tightening bar 40, a cam member 70, a cover 50, a lever 60, and two coil springs 90.

The tightening bar 40 includes an enlarged head 42, a shank body 41, and an actuated end 43. The enlarged head 42 includes a threaded portion 421 and a screw nut 422 which threadedly engages the threaded portion 421 to be outboard of the right fork blade 32. The shank body 41 is integrally formed with and extends from the threaded portion 421, and is received into and is movable relative to the hub assembly 30 along the hub axis (X). The actuated end 43 is connected to the shank body 41 opposite to the threaded portion 421. The actuated end 43 has an inner peripheral wall 431 which defines a through hole 44 extending along a rotating axis (Y) transverse to the hub axis (X) and which has a cam follower surface 441. The actuated end 43 is disposed outboard of the left fork blade 31.

The cam member 70 has front and rear ends 71, 75 opposite to each other along the rotating axis (Y), a cam segment 73 which is interposed between the front and rear ends 71, 75, a front journal segment 72 which is interposed between the front end 71 and the cam segment 73, and a rear journal segment 74 which is interposed between the rear end 75 and the cam segment 73. The cam segment 73 is received in the through hole 44 to be rotatable about the rotating axis (Y), and is configured to engage the cam follower surface 441 such that when the cam segment 73 is rotated about the rotating axis (Y), the actuated end 43 is moved between a tightening position, where the actuated end 43 is remote from the left fork blade 31, and a loosening position, where the actuated end 43 is closer to the left fork blade 31.

The cover 50 includes front and rear walls 51,52 which are spaced apart from each other along the rotating axis (Y) to define an accommodation space 57 therebetween for receiving the actuated end 43 and the cam segment 73. The front and rear walls 51,52 respectively have an access bore 55 and an access hole 56 which are communicated with the accommodation space 57 such that the front and rear journal segments 72, 74 of the cam member 70 are disposed outwardly of the through hole 44 in the actuated end 43 to be journalled in the access bore 55 and the access hole 56, respectively, and to rotate relative to the front and rear walls 51,52, respectively. Thus, the front and rear ends 71,75 of the cam member 70 extend respectively and outwardly of the access bore 55 and the access hole 56.

In this embodiment, the rear end 75 of the cam member 70 includes a spindle segment 751 which is integrally formed with the rear journal segment 74, and which is dimensioned such that when the cam segment 73 is led by the spindle segment 751 into the through hole 44 so as to bring the cam segment 73 into engagement with the cam follower surface 441, the spindle segment 751 is permitted to extend outwardly of the access hole 56. The rear end 75 of the cam member 70 further includes a stud 752 which has inner and outer tubular surfaces 753, 754 that are opposite to each other in radial directions relative to the rotating axis (Y). The inner and outer tubular surfaces 753, 754 are configured to be in splined engagement with the spindle segment 751 and an insert hole 66 in the lever 60, respectively.

Moreover, the cover 50 further includes a bottom wall 59 which confronts the left fork blade 31, which has an access opening 591 communicated with the accommodation space 57 so as to permit the actuated end 43 to be brought into the accommodation space 57. The cover 50 further includes a flange 54 which is disposed to surround the bottom wall 59, and which has a friction surface 58 for frictional engagement with the left fork blade 31.

The lever 60 includes a handle portion 61 having proximate and distal ends 611,612 opposite to each other along a lengthwise direction, and front and rear lug portions 62,63 respectively extending from the proximate end 611 away from the distal end 612. The front and rear lug portions 62,63 are spaced apart from each other along the rotating axis (Y) to respectively flank the front and rear walls 51,52, and respectively have an insert bore 64 and the insert hole 66. In this embodiment, the insert bore 64 is substantially rectangular in shape, and the insert hole 66 has a toothed shape. Thus, the front end 71 and the outer tubular surface 754 of the stud 752 are respectively fitted in and in non-rotatable engagement with the insert bore 64 and the insert hole 66, respectively, so as to be turned with the front and rear lug portions 62,63, respectively, thereby enabling the cam segment 73 to be rotated by a turning movement of the distal end 612 of the handle portion 61 about the rotating axis (Y). The front and rear lug portions 62,63 respectively have front and rear barriers 622, 632 on outer surfaces 621,631 thereof, which are configured to be in sliding contact with the flange 54 when the front and rear lug portions 62, 63 are turned about the rotating axis (Y).

The coil springs 90 are disposed to surround the shank body 41 of the tightening bar 40.

In assembly, the tightening bar 40 is first inserted into the hub assembly 30 along the hub axis (X). The screw nut 422 is then screwed to the threaded portion 421 to be outboard of the right fork blade 32. Subsequently, the cover 50 is disposed outboard of the left fork blade 31 such that one coil spring 90 abuts against the right fork blade 32 and the screw nut 422, and the other coil spring 90 abuts against the left fork blade 31 and the actuated end 43 so as to bias the actuated end 43 toward the left fork blade 31.

In use, referring to FIGS. 4 to 7, when the distal end 612 of the lever 60 is turned, the cam member 70 is rotated about the rotating axis (Y) by means of the non-rotatable engagement of the insert bore 64 with the front end 71, the splined engagement of the insert hole 66 with the outer tubular surface 754, and the splined engagement of the spindle segment 751 and the inner tubular surface 753, thereby resulting in the movement of the actuated end 43 along the hub axis (X) between the tightening and loosening positions by virtue of the engagement of the cam segment 73 with the cam follower surface 441.

Preferably, when the handle portion 61 of the lever 60 is turned to an upper dead point, the front and rear barriers 622,632 are engaged with the flange 54 so as to restrain the turning movement of the handle portion 61.

As illustrated, according to this invention, since the lever 60 is coupled with the cam member 70 and is operated to rotate the cam member 70 from two sides (i.e., the front and rear lug portions 62,63), the driving force applied to the cam member 70 is evenly distributed so that wobbling of the cam member 70 is prevented. Thus, operation of the quick release device of this invention is stable and smooth. Moreover, since the cam member 70 will not wobble during the rotation process, precision of movement of the tightening bar 40 can be achieved.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A quick release device for a bicycle, the bicycle including left and right fork blades spaced apart from each other along a hub axis, and a hub assembly rotatable about the hub axis, said quick release device comprising:
   a tightening bar including
   an enlarged head which is adapted to be outboard of the right fork blade,
   a shank body which extends from said enlarged head, and which is movable relative to the hub assembly along the hub axis, and an actuated end which is connected to said shank body opposite to said enlarged head, which has a cam follower surface, and which is adapted to be outboard of the left fork blade;

a cam member having front and rear ends opposite to each other along a rotating axis transverse to the hub axis, and a cam segment, which is interposed between said front and rear ends, which is rotatable about the rotating axis, and which is configured to engage said cam follower surface such that when said cam segment is rotated about the rotating axis, said actuated end is moved between a tightening position, where said actuated end is remote from the left fork blade, and a loosening position, where said actuated end is closer to the left fork blade;

a cover including front and rear walls which are spaced apart from each other along the rotating axis to define an accommodation space therebetween for receiving said actuated end and said cam segment, and which have an access bore and an access hole, respectively, said access bore and said access hole being communicated with said accommodation space such that said front and rear ends extend respectively and outwardly of said access bore and said access hole; and a lever including
a handle portion having proximate and distal ends opposite to each other along a lengthwise direction, and
front and rear lug portions extending from said proximate end away from said distal end, said front and rear lug portions being spaced apart from each other along the rotating axis to respectively flank said front and rear walls of said cover, and being coupled respectively with said front and rear ends of said cam member to enable said cam segment to be rotated by a turning movement of said distal end about the rotating axis, said rear lug portion having an insert hole said rear end including a spindle segment and a stud which has inner and outer tubular surfaces that are opposite to each other in radial directions relative to the rotating axis, said inner and outer tubular surfaces being configured to be in splined engagement with said spindle segment and said insert hole, respectively.

2. A quick release device for a bicycle, the bicycle including left and right fork blades spaced apart from each other along a hub axis, and a hub assembly rotatable about the hub axis, said quick release device comprising:

a tightening bar including
an enlarged head which is adapted to be outboard of the right fork blade,
a shank body which extends from said enlarged head, and which is movable relative to the hub assembly along the hub axis, and
an actuated end which is connected to said shank body opposite to said enlarged head, which has a cam follower surface, and which is adapted to be outboard of the left fork blade;

a cam member having front and rear ends opposite to each other along a rotating axis transverse to the hub axis, and a cam segment, which is interposed between said front and rear ends, which is rotatable about the rotating axis, and which is configured to engage said cam follower surface such that when said cam segment is rotated about the rotating axis, said actuated end is moved between a tightening position, where said actuated end is remote from the left fork blade, and a loosening position, where said actuated end is closer to the left fork blade, said cam member further having a front journal segment which is interposed between said front end and said cam segment, and a rear journal segment which is interposed between said rear end and said cam segment, said rear end including a spindle segment which is integrally formed with said rear journal segment, said rear end including a stud which has inner and outer tubular surfaces that are opposite to each other in radial directions relative to the rotating axis, said inner tubular surfaces being configured to be in splined engagement with said spindle segment;

a cover including front and rear walls which are spaced apart from each other along the rotating axis to define an accommodation space therebetween for receiving said actuated end and said cam segment, and which have an access bore and an access hole, respectively, said access bore and said access hole being communicated with said accommodation space such that said front and rear journal segments are disposed outwardly of said actuated end so as to be journalled in said access bore and said access hole, respectively, and to rotate relative to said front and rear walls, respectively, and such that, when said cam segment is led by said spindle segment into said actuated end so as to bring said cam segment into engagement with said cam follower surface, said spindle segment is permitted to extend outwardly of said access hole; and a lever including
a handle portion having proximate and distal ends opposite to each other along a lengthwise direction, and
front and rear lug portions extending from said proximate end away from said distal end, said front and rear lug portions being spaced apart from each other along the rotating axis to respectively flank said front and rear walls of said cover, and respectively having an insert bore and an insert hole which are configured such that said front end and said outer tubular surface are respectively fitted in and are in non-rotatable engagement with said insert bore and said insert hole so as to be turned with said front and rear lug portions, respectively to enable said cam segment to be rotated by a turning movement of said distal end about the rotating axis.

3. The quick release device of claim 2, wherein said actuated end has an inner peripheral wall which defines a through hole extending along the rotating axis so as to receive said cam segment, said cam follower surface being formed on said inner peripheral wall.

4. The quick release device of claim 1, further comprising a coil spring which is disposed to surround said shank body adjacent to said actuated end so as to bias said actuated end toward the left fork blade.

5. The quick release device of claim 1, wherein said cover has a bottom wall which is adapted to confront the left fork blade, which has an access opening communicated with said accommodation space so as to permit said actuated end to be brought into said accommodation space.

6. The quick release device of claim 5, wherein said cover has a flange which is disposed to surround said bottom wall, and which is configured to be in sliding contact with said front and rear lug portions when said front and rear lug portions are turned about the rotating axis.

7. The quick release device of claim 6, wherein said front and rear lug portions respectively have front and rear barriers which are configured to be engaged by said flange to thereby restrain the turning movement of said distal end.

\* \* \* \* \*